United States Patent [19]

Matsumura et al.

[11] 3,933,986

[45] Jan. 20, 1976

[54] PROCESS FOR PRODUCING CARBON FIBERS

[75] Inventors: Yasuo Matsumura; Soichiro Kishimoto; Masahiko Ozaki, all of Okayama, Japan

[73] Assignee: Japan Exlan Company Limited, Japan

[22] Filed: Apr. 11, 1974

[21] Appl. No.: 460,147

[30] Foreign Application Priority Data

Apr. 25, 1973 Japan................................ 48-47010

[52] U.S. Cl.................................. 423/447; 264/29
[51] Int. Cl.².......................................... C01B 31/07
[58] Field of Search........................ 423/447; 264/29

[56] References Cited
UNITED STATES PATENTS

| 3,412,062 | 11/1968 | Johnson et al.................. 423/447 X |
| 3,529,934 | 9/1970 | Shindo............................... 423/447 |
| 3,532,466 | 10/1970 | Johnson et al...................... 423/447 |
| 3,539,295 | 11/1970 | Ram................................... 423/447 |

*Primary Examiner*—Edward J. Meros
*Attorney, Agent, or Firm*—Wenderoth, Lind & Ponack

[57] ABSTRACT

A process for producing carbon fibers which comprises (a) treating preoxidized fibers produced from an acrylonitrile fiber with a reducing liquid containing a specific compound and (b) thereafter carbonizing or graphitizing the treated fibers at a temperature above 800°C. The thus-obtained carbon or graphite fibers have a high tensile strength and a high modulus of elasticity.

13 Claims, 1 Drawing Figure

U.S. Patent   Jan. 20, 1976   3,933,986
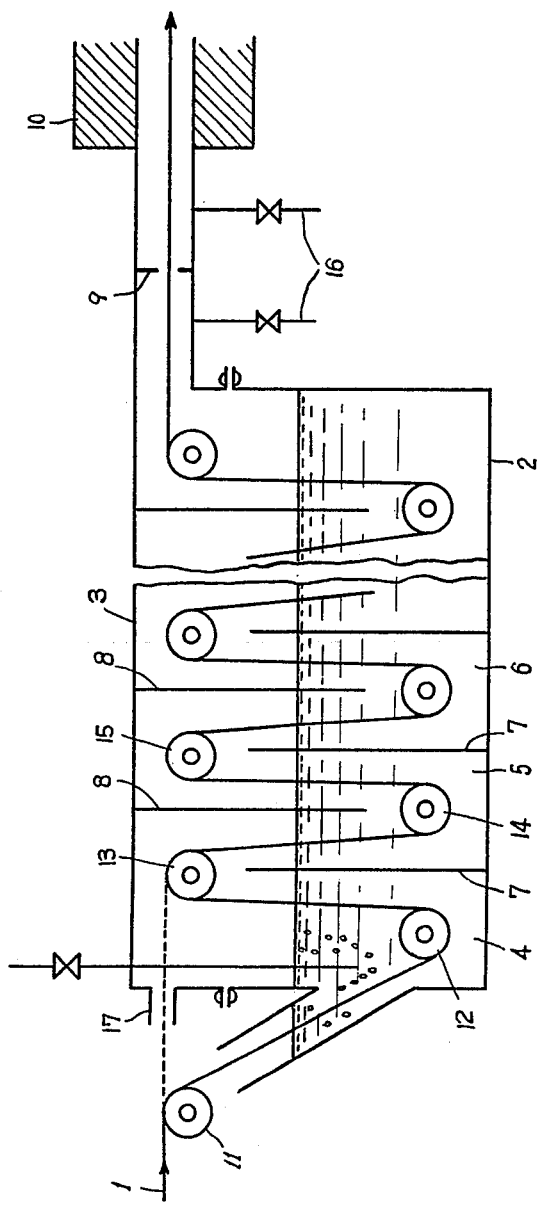

PROCESS FOR PRODUCING CARBON FIBERS

The present invention relates to a process for producing carbon fibers (including graphite fibers) from acrylic fibers, and more particularly to a process for producing carbon fibers in an industrially advantageous manner which are excellent in tensile strength and modulus of elasticity by treating preoxidized fibers produced from an acrylonitrile fiber with a reducing liquid containing a specific compound and thereafter subjecting the fibers to heat treatment at a temperature above 800°C. in a non-oxidizing atmosphere.

It is known that carbon fibers having excellent properties as reinforcement materials, exothermic bodies, heat resistant materials and the like can be obtained by heating acrylonitrile fibers in an oxidizing atmosphere at a temperature below about 400°C. to obtain preoxidized fibers and then heating the thus-obtained preoxidized fibers in a non-oxidizing atmosphere at a higher temperature usually above 800°C.

However, this process suffers from a defect that the carbon fibers thus obtained will have a seriously lowered strength because of the presence of a slight amount of oxygen in the step of heating acrylic fibers in a non-oxidizing atmosphere at the higher temperature, namely the carbonizing step or the secondary heating step.

Therefore, to remove such a defect, there has been heretofore studied a process wherein the slight amount of oxygen is removed from the non-oxidizing gas with which the heating furnace is supplied, or a process wherein a large amount of a non-oxidizing gas is jetted into the heating furnace to rapidly remove the slight amount of oxygen present in the atmosphere in the heating furnace. Such processes, however, have disadvantages that they not only consume a large amount of high purity non-oxidizing gas but also lower the energy efficiency in the heating furnace and require a special purification apparatus for the non-oxidizing gas. In addition, such processes have a further defect that it is difficult for them to give a high strength to the thus-obtained fibers when purification of the gas is insufficient.

Also, to prevent contamination of oxygen from the surrounding atmosphere upon continuously supplying the preoxidized fibers obtained according to the ordinary process from the air into a non-oxidizing atmosphere above 800°C., a process was studied wherein the fibers are passed through a curtain of an inert gas such as nitrogen or through an inert liquid. However, neither of them gives any particular consideration to the oxygen carried into the heating furnace by the preoxidized fibers themselves, and therefore the carbon fibers thus obtained were not satisfactory enough in strength.

Under these circumstances, we made an intensive study to remove such disadvantages. On the basis of the idea that the atmosphere in the heat treatment furnace is not the only cause of the decrease in strength due to oxygen and that it is necessary to consider the influence of the slight amount of oxygen absorbed between or within the preoxidized fibers supplied into the heat treatment furnace, we treated preoxidized fibers, obtained by ring formation of acrylic fibers by heating, with a specific reducing liquid capable of inactivating oxygen and then exposed the fibers to a higher temperature heat treatment in a non-oxidizing atmosphere. The carbon fibers thus obtained were found to have a remarkably improved tensile strength and modulus of elasticity. This finding led to the present invention.

The main object of the present invention is to produce carbon fibers having an excellent strength and modulus of elasticity in a continuous manner.

An object of the invention is to produce carbon fibers having a high tensile strength and a high modulus of elasticity in an industrially advantageous manner.

Other objects of the invention will become apparent from the following detailed explanation.

These objects of the present invention are achieved by treating preoxidized fibers obtained from acrylic fibers with a reducing liquid containing at least one compound selected from the group consisting of (1) oxyacids of sulfur and their salts, (2) sulfinic acids, sulfenic acids and their salts and acid halides, and (3) aromatic compounds having two or more hydroxyl groups connected to the same benzene ring, and thereafter subjecting the fibers to heat treatment in a nonoxidizing atmosphere at a temperature above 800°C.

By the use of the process of the present invention, the oxygen absorbed within the preoxidized fibers and contained in the interspace between them is inactivated or removed effectively during their passage through the reducing liquid, and therefore degradation reactions, such as oxidation reaction and molecule breakage, liable to take place during the subsequent higher temperature heat treatment in a non-oxidizing atmosphere, are markedly suppressed to give carbon fibers having excellent strength characteristics.

Also, by following the process of the present invention, the strength of the fibers during the higher temperature heating step is markedly heightened. This results in a sharp decrease in troubles such as filament breaking in the heating furnace, so that the efficiency in continuous operation and the stability in the quality of the product become markedly improved.

Furthermore, by the process of the present invention, speedup of temperature rise rate becomes possible. This markedly heightens the productive capacity of the carbon fibers and largely contributes to the reduction of heat loss and production costs.

The acrylonitrile fibers as used herein refer to fibers produced from polyacrylonitrile or from copolymers of acrylonitrile containing acrylonitrile in an amount of at least 80 mol percent, preferably more than 90 mol percent. As the copolymeric components can be mentioned well known ethylenically unsaturated compounds such as allyl alcohol, methallyl alcohol, hydroxyethyl acrylonitrile, acrylic acid, methacrylic acid, crotonic acid, itaconic acid, methacrylonitrile, α-methyleleglutaronitrile, isopropenyl acetate, acrylamide, N-methylolacrylamide, β-hydroxyethyl methacrylate, dimethylaminoethyl methacrylate, vinylpyridine, vinylpyrrolidone, methyl acrylate, methyl methacrylate, vinyl acetate, allyl chloride, sodium methallyl sulfonate, potassium p-styrene sulfonate, etc.

Such acrylic fibers are supplied to the process of the present invention after being made into preoxidized fibers, in which polynaphthyridine structure is formed, generally by a well known method, for example by heat treatment at a temperature between 150° and 400°C. in an oxidizing atmosphere. However, any preoxidized fibers having such structure may be used for the present invention even though they might be produced by any other method.

The preoxidized fibers thus obtained are then made to pass through a bath of a particular reducing liquid and thereafter introduced into a non-oxidizing atmosphere where the fibers are subjected to the prescribed higher temperature heating treatment. At this time, the preoxidized fibers having been subjected to the reducing liquid treatment are introduced into the non-oxidizing atmosphere in the carbonizing furnace, desirably without being contacted with the outer atmosphere (namely air which is an oxygen-containing atmosphere) so that the preoxidized fibers are maintained nearly completely free from oxygen which otherwise would be carried into the heating furnace accompanied with the fibers. In this way, the objects and effects of the present invention are achieved more advantageously and satisfactorily. To make an additional remark, the objects of the present invention are sufficiently achieved of course even when the preoxidized fibers having been subjected to the reducing liquid treatment are exposed to an oxygen-containing atmosphere, provided that the duration of exposure is so short that oxygen is not absorbed within the fibers. In this case, the preoxidized fibers are introduced into the carbonizing furnace filled with a non-oxidizing atmosphere through a known suitable sealing means.

As the apparatus used in the practice of the process of the present invention, any apparatus may be used which are able to introduce the preoxidized fibers into the carbonizing furnace filled with a non-oxidizing atmosphere. As an example, the apparatus as in the annexed drawing can be shown.

FIG. 1 is a cross-section of an apparatus suitable for carrying out the present invention. In FIG. 1, the preoxidized fibers 1 are made to pass over a guide roller 11 and are introduced into a closed treating vessel 2 having a cover 3. The treating vessel 2 is partitioned into at least three chambers by partitioning boards 7. The first chamber 4 and the third chamber 6 and the following are filled with water or an inert liquid, and the second chamber 5 contains the reducing liquid according to the present invention. Inside the cover 3, partitioning boards 8 are provided such that each board is positioned between respective boards 7, the partitioning boards 8 thus dividing the upper atmosphere of the treating vessel 2 and at the same time serving to heighten an effect for changing the atmosphere in the upper space. The preoxidized fibers, after passing the first chamber 4 filled with water or an inert liquid capable of shutting out the outer atmosphere, are moved over guide rollers 12, 13 and 14 into the second chamber, 5, where the fibers are subjected to the reducing liquid treatment according to the present invention. The fibers then pass over guide roller 15 and are washed in the third chamber 6 and the following. Thereafter, the fibers pass through slit 9 and are moved into carbonizing furnace 10. The treating vessel 2 is equipped with an inlet 16 and an outlet 17 for the non-oxidizing gas so that during treatment operation the upper atmosphere of the treating vessel 2 is replaced with the non-oxidizing gas. Alternatively, a process may be adopted wherein the preoxidized fibers 1, after passing over the guide roller 11, pass through the outlet 17 for the non-oxidizing gas and then moved by guide rollers 13 and 14 into the second chamber 5 where the fibers are subjected to the reducing liquid treatment.

The reducing liquids as used in the present invention refer to liquids containing at least one compound selected from the group consisting of (a) oxyacids of sulfur and their salts, such as thiosulfuric acid, polythionic acid ($H_3S_xO_6$ wherein $x$ is 3, 4, 5 or 6), dithionic acid ($H_2S_2O_6$), sulfurous acid, pyrosulfurous acid ($H_2S_2O_5$), dithionous acid ($H_2S_2O_4$) and their alkali-metal salts, alkaline earth metal salts, ammonium salts, and Rongalit ($CH_2 \cdot OH.SO_2Na$), (b) sulfinic acids, sulfenic acids, and their alkali-metal salts, alkaline earth metal salts, ammonium salts and their acid halides, and (c) reducing compounds having a strong oxygen-inactivating action, selected from aromatic compounds having at least two hydroxyl groups connected to the same benzene ring, such as catechol, hydroquinone, resorcin, pyrogallol, phloroglucin, naphthohydroquinone, anthrahydroquinone, etc. Particularly, the foregoing aromatic compounds preferably have the hydroxyl groups at the ortho- or parapositions. The aromatic compounds are not limited to monocyclic carbon compounds, and polycyclic carbon compounds may be use if they are reducing compounds having at least two hydroxyl groups connected to the same benzene ring. Furthermore, organic residues such as sulfonic acid group, carboxyl group, etc. may be introduced into the molecule to the extent that the reducing power is not substantially lowered. In addition, quinhydrone which is the molecular compound of hydroquinone and quinone or a mixed aqueous solution of dithionite and β-anthraquinone sulfonate in which quinone has been substantially converted to the reducing type is useful as a reducing compound according to the present invention.

In the treatment using such a reducing liquid, the action of the reducing compound is rendered more effective by maintaining the pH of the treating liquid above 10. As pH-adjusting agents, sodium hydroxide, potassium hydroxide and aqueous ammonia may be used.

The concentration of the reducing compound in the treating liquid can be varied in accordance with the kind of the compound, treating temperature, treating time, the pH of the treating liquid, etc. Thus, it is difficult to limit the concentration clearly within a fixed range, but in general a concentration within the range of 1 to 50 weight percent, preferably 5 to 35 weight percent, is used.

These compounds are generally used after being dissolved in water as the reducing liquids of the present invention, but there are cases where they may be used after being dissolved in an organic solvent such as alcohol, acetone, trichloroethylene, or the like.

The reducing compound deposited on the preoxidized fibers by the treatment according to the present invention is desirably washed off the fibers before the carbonizing step when the compound is an inorganic salt or an alkali metal compound.

The effect of the treatment by the reducing liquid appears in a very short time so that the object of the treatment is achieved substantially within several minutes. But because of restrictions imposed on the apparatus, the fibers are treated for one to 60 minutes as a matter of fact. The temperature of the reducing liquid is below 100°C., preferably 0° to 50°C., for the best result 5° to 40°C.

The preoxidized fibers made to pass through the reducing liquid are then introduced into a non-oxidizing atmosphere, preferably without being exposed to an oxygen-containing atmosphere, and are carbonized or graphitized at a temperature above 800°C. in the ordinary manner. By this process the object carbon fibers having excellent properties can be produced to advantage in an industrial manner.

As the carbonizing temperature, a temperature generally below 2000°C. is used. For further graphitizing the thus-obtained carbon fibers, a temperature between 2000° and 3500°C. is used. As the carbonizing or graphitizing atmosphere, nitrogen, hydrogen, helium, argon or the like is preferably used. The carbonizing or graphitization may be carried out under reduced or increased pressure. To produce carbon fibers having a better tensile strength and modulus of elasticity, it is preferable to heat the fibers under tension as is generally known. It is particularly effective to apply tension upon preoxidation and carbonization or graphitization.

Thus, by adopting the process of the present invention, it has become possible to produce carbon fibers having an excellent tensile strength and modulus of elasticity.

For a better understanding, representative examples will be given in the following. In the examples, the percentages and parts are shown by weight unless otherwise indicated.

EXAMPLE 1

A filament tow of acrylonitrile fibers produced from a copolymer consisting of 98 mole % acrylonitrile and 2 mol % methacrylic acid was heated in air with its temperature raised continuously from 200° to 300°C. at the rate of 1°C. per minute to obtain preoxidized fibers. The preoxidized fibers were led into a reducing treatment vessel composed of four chambers whose upper spaces were filled with nitrogen gas. The first chamber contained water, the second chamber contained a reducing liquid prepared with 15 parts of sodium dithionite, 2 parts of sodium $\beta$-anthraquinonesulfonate, 100 parts of water and 20 parts of potassium hydroxide, and the third and fourth chambers contained water for washing. The preoxidized fibers were made to pass through the reducing treatment vessel in 60 minutes, and the, without being exposed to air, were led into the carbonizing step where the fibers were subjected to carbonizing treatment by being heated in a nitrogen gas atmosphere with the temperature raised up to 1500°C. at the rate of 100°C./minute.

The carbon fibers thus obtained has a tensile strength of 311 kg./mm$^2$ and a modulus of elasticity of 23.4 ton/mm$^2$.

On the other hand, for purposes of comparison, the same procedure was repeated except that all the liquids in the reducing chambers were replaced with water. The thus-obtained carbon fibers had a tensile strength of 221 kg/mm$^2$ and a modulus of elasticity of 19.4 ton/mm$^2$, both being unsatisfactory.

EXAMPLE 2

A filament tow of acrylonitrile fibers produced from a copolymer consisting of 97 mol % acrylonitrile and 3 mol % methacrylic acid was heated in air with its temperature raised continuously from 200° to 300°C. in 50 minutes to obtain preoxidized fibers.

The preoxidized fibers were passed through the reducing liquid in the same manner as in Example 1. The fibers were then subjected to carbonizing treatment by being heated in a nitrogen gas atmosphere with the temperature raised continuously up to 1500°C. at the rate of 15°C./minute to obtain the object carbon fibers.

The carbon fibers thus obtained had a tensile strength of 245 kg/mm$^2$ and a modulus of elasticity of 17.1 ton/mm$^2$.

On the other hand, carbon fibers were obtained by carbonization in the same procedure as above except that all the liquids in the reducing chambers were replaced with water. The fibers had a tensile strength of 190 kg/mm$^2$ and a modulus of elasticity of 16.0 ton/mm$^2$.

As apparent from the above, it will be understood that the treatment with the particular reducing liquid contributes to the improvement of the tensile strength and modulus of elasticity of the carbon fibers.

EXAMPLE 3

A filament tow of acrylonitrile fibers produced from a copolymer consisting of 97 mol % acrylonitrile and 3 mol % acrylic acid was treated in the same manner as in Example 2 except for using as the reducing liquid a liquid prepared 7 parts of calcium dithionite, 1 part of sodium $\beta$-anthraquinonesulfonic acid and 100 parts of water. Carbon fibers were obtained which had a tensile strength of 240 kg/mm$^2$ and a modulus of elasticity of 17.0 ton/mm$^2$.

On the other hand, when the reducing liquid was replaced with water, the tensile strength and the modulus of elasticity of the carbon fibers were only 190 kg/mm$^2$ and 15.6 ton/mm$^2$, respectively.

EXAMPLE 4

A filament tow of acrylonitrile fibers produced from a copolymer consisting of 94 mol % acrylonitrile and 6 mol % methyl acrylate was treated in the same manner as in Example 1 except for using as the reducing liquid a liquid prepared from 1 part of calcium dithionite and 100 parts of water. The thus-obtained carbon fibers had a tensile strength of 65 kg/mm$^2$ and a modulus of elasticity of 18.8 ton/mm$^2$.

On the other hand, when the fibers were not subjected to treatment with a reducing liquid, carbon fibers were obtained which had a tensile strength and a modulus of elasticity as low as 180 kg/mm$^2$ and 13.5 ton/mm$^2$, respectively, both of which were unsatisfactory.

EXAMPLE 5

A filament tow of acrylonitrile fibers produced from a copolymer consisting of 90 mol % acrylonitrile, 4 mol % methacrylic acid and 6 mol % methyl methacrylate was treated in the same manner as in Example 1 except for using as the reducing liquid a liquid prepared from 3 parts of quinhydrone and 100 parts of water. The thus-obtained carbon fibers had a tensile strength of 245 kg/mm$^2$ and a modulus of elasticity of 19.1 ton/mm$^2$.

On the other hand, when the fibers were not subjected to treatment with a reducing liquid, carbon fibers were obtained which had a tensile strength and modulus of elasticity as low as 170 kg/mm$^2$ and 14.4 ton/mm$^2$, respectively.

From the above experiments, it has become apparent that the tensile strength and modulus of elasticity of carbon fibers can be markedly improved by the treatment with the reducing liquid according to the present invention.

What we claim is:

1. A process for producing carbon fibers which comprises (a) treating preoxidized fibers produced by heating acrylonitrile fibers in an oxygen-containing atmosphere at a temperature between 150°C and 400°C with a reducing liquid containing at least one compound selected from the group consisting of thiosulfuric acid, polythionic acid, dithionic acid, sulfurous acid, pyrosulfurous acid dithionous acid ($H_2S_2O_4$) and their salts, and (b) thereafter carbonizing or graphitizing the thus treated fibers in a non-oxidizing atmosphere at a temperature above 800°C.

2. The process for producing carbon fibers as claimed in claim 1 wherein the reducing liquid is an aqueous solution containing a dithionite salt and a $\beta$-anthraquinone sulfonate salt.

3. The process as claimed in claim 1 wherein the preoxidized fibers after being subjected to reducing liquid treatment are introduced into a carbonizing furnace without contact with the outer atmosphere and then carbonized or graphitized.

4. The process for producing carbon fibers as claimed in claim 1 wherein the reducing liquid is maintained at a pH above 10.

5. The process for producing carbon fibers as claimed in claim 1 wherein the reducing compound in the reducing liquid is in concentration of 1 to 50% by weight.

6. The process for producing carbon fibers as claimed in claim 1 wherein the reducing liquid is maintained at a temperature below 100°C.

7. The process for producing carbon fibers as claimed in claim 1 wherein the reducing liquid contains water as the medium.

8. The process as claimed in claim 1 characterized in that the preoxidized fibers are treated for 1 to 60 minutes in the reducing liquid.

9. The process for producing carbon fibers as claimed in claim 1 wherein the acrylonitrile fiber is a fiber made from an acrylonitrile homopolymer or an acrylonitrile copolymer containing acrylonitrile in an amount of at least 80 mol % and another ethylenically unsaturated compound.

10. The process for producing carbon fibers as claimed in claim 9 wherein the acrylonitrile fiber is a fiber made from an acrylonitrile copolymer containing at least 90 mol % acrylonitrile.

11. The process for producing carbon fibers as claimed in claim 1 wherein the oxygen-containing atmosphere is air.

12. The process for producing carbon fibers as claimed in claim 1 wherein the non-oxidizing atmosphere is nitrogen.

13. The process for producing carbon fibers as claimed in claim 1 wherein the treated fibers are carbonized in a non-oxidizing atmosphere at a temperature of from 800° to 2000°C. and thereafter graphitized in a non-oxidizing atmosphere at a temperature of from 2000° to 3500°C.

* * * * *